United States Patent
Koerner

Patent Number: 6,109,590
Date of Patent: Aug. 29, 2000

[54] IRON ORE SLIDE VALVE WITH INTERNAL SUPPORT CLAMP

[75] Inventor: Andre F. Koerner, Missouri City, Tex.

[73] Assignee: Tapco International, Inc., Houston, Tex.

[21] Appl. No.: 09/024,964

[22] Filed: Feb. 12, 1998

[51] Int. Cl.[7] .................................................. F16K 3/30
[52] U.S. Cl. .................... 251/152; 251/326; 137/315; 137/375; 285/364
[58] Field of Search ................................. 251/152, 326, 251/327, 329, 215; 137/375, 315, 614.04; 285/364, 365, 366, 367

[56] References Cited

U.S. PATENT DOCUMENTS

| | | | |
|---|---|---|---|
| 2,787,439 | 4/1957 | Bredtschneider | 251/329 |
| 3,290,003 | 12/1966 | Kessler | 137/315 |
| 3,602,532 | 8/1971 | Ehrenberg | 285/365 X |
| 3,680,188 | 8/1972 | Mason et al. | 285/367 X |
| 3,964,507 | 6/1976 | Jandrasi et al. | 251/326 X |
| 3,993,285 | 11/1976 | Conley | 251/329 X |
| 4,036,258 | 7/1977 | Wolters et al. | 137/614.04 |
| 4,081,175 | 3/1978 | Hasbrouck | 251/329 X |
| 4,215,845 | 8/1980 | Sturgeon | 251/327 X |
| 4,253,487 | 3/1981 | Worley et al. | 137/375 |
| 4,316,483 | 2/1982 | Jandrasi | 137/315 |
| 4,512,363 | 4/1985 | Jandrasi et al. | 137/375 |
| 4,512,369 | 4/1985 | Takahashi | 137/614.04 |
| 4,541,453 | 9/1985 | Graf et al. | 251/327 X |
| 5,011,196 | 4/1991 | Sabatier et al. | 285/367 |
| 5,123,440 | 6/1992 | Houston et al. | 251/326 X |
| 5,301,712 | 4/1994 | Treichel et al. | 137/375 |
| 5,694,971 | 12/1997 | Wilcock | 251/215 X |
| 5,732,930 | 3/1998 | Fritz, Jr. | 251/326 X |

*Primary Examiner*—Stephan M. Hepperle
*Assistant Examiner*—John Bastianelli
*Attorney, Agent, or Firm*—James F. Weiler

[57] ABSTRACT

Disclosed is a control slide valve for control of product flow through it in which the valve internals are maintained in position by the clamping action of a split clamp and may be released and removed and replaced through the bonnet quickly and easily by release and reclamping the split clamp rather than by utilizing bolts which often gall, break, and are difficult to remove and replace. The slide valve is particularly suited for high temperature abrasive flow.

10 Claims, 4 Drawing Sheets

6,109,590

IRON ORE SLIDE VALVE WITH INTERNAL SUPPORT CLAMP

FIELD OF THE INVENTION

The present invention is directed to slide valves utilized for high temperature and high velocity flow and particularly for high abrasive flow such as iron ore.

BACKGROUND OF THE INVENTION

Slide valves utilized in controlling high temperature and high velocity flow of abrasive products through the valve have a number of disadvantages—for example, utilization of bolting that is under load due to differential pressure in the valves—are only as strong as the bolting system strength of bolts which feasibly could be placed in the same area, require the use of gaskets, it is difficult to remove and replace bolts that often gall, and bolts are not well suited for small and medium sized valves having limited space which complicate drilling and tapping bolt holes in conventional designs.

The present invention solves long existing needs for highly abrasive flow such as iron ore, for example the needs of Fior De Venezuela in controlling iron ore flow.

PRIOR ART

The following patents represent the current state of the art with respect to slide valves.

Treichel et al., U.S. Pat. No. 5,301,712, discloses background information concerning slide valves, their applications, problems, and the like of slide valves in the field of use of the present invention to which reference is made. It also discloses a slide valve assembly including an orifice and a slide valve slidable in the guides of the orifice plate assembly. The orifice plate assembly is slidable into and out of position in the slide valve housing through a side opening via grooves formed in the inner walls of the housing.

Houston et al., U.S. Pat. No. 5,123,440, discloses a slide valve for use in high temperature environments. The mounting ring of the slide valve is propped against the bed plate by a plurality of columns which are adjustable by screws connecting gussets to rails upon which the slide or disc slides.

Wiese, U.S. Pat. No. 5,096,099, discloses a slide valve with an adjustable cover that is connected at an opening to a container by a plurality of socket head screws.

Owens et al., U.S. Pat. No. 5,082,247, discloses a split seat gate valve located within a length of pipeline. The valve is disposed between flanged openings in the pipeline and is secured by a plurality of bolts.

Jandrasi, U.S. Pat. No. 4,693,452, discloses several embodiments of slide valves for high corrosive environments. In the most relevant embodiments, the orifice plate and guide rails of the slide valve are attached to the valve housing by a plurality of bolts that run parallel to the flow direction to connect the valve assembly.

Purvis, U.S. Pat. No. 4,612,955, discloses an edge wear tab used to prevent corrosion around the orifice in high temperature applications. Slides are slidably mounted in rails which are bolted to the valve housing.

Graf et al., U.S. Pat. No. 4,542,453, discloses a slide valve for high temperature gas lines. The internals are removed only by disassembly of the valve housing.

Jandrasi et al., U.S. Pat. No. 4,531,539, discloses a slide valve. The orifice plate of the slide valve is releasably secured in place by bolts running parallel to flow direction.

Jandrasi et al., U.S. Pat. No. 4,512,363 discloses a valve assembly wherein the valve internals (orifice assembly, valve seat, guides, and slide) are removably secured to the valve body by a clamping action. The clamping action is established by a valve liner which engages the orifice assembly and presses it into abutment with the valve body. A lower flange of the liner is removably positioned between the slide valve body and outlet member.

Jandrasi et al., U.S. Pat. No. 4,458,879, discloses a valve wherein the valve internals are held in position by a clamping action of a quick make-up cylinder. The orifice plate with guides for the slide is clamped to the valve body by a quick connect cylinder that screws into the valve body.

Worley et al., U.S. Pat. No. 4,253,487, discloses a slide valve using a pair of opposing discs to control fluid flow through the valve. The guide rails within which the discs slide are held in place by bolts that run parallel to the flow direction.

It would be advantageous to provide a slide valve which eliminates bolting that is under load to differential pressures in the valve, which is much stronger than a bolted system for maintaining the internals in position or which eliminates bolting altogether, and which is much greater than the number of bolts which could feasibly be placed in the same area, which has superior sealing, and eliminates the need for a gasket (although a gasket may be used, if desired), is easier to remove and replace internals rather than one utilizing bolts which often gall, break, or are difficult to remove and replace, in which the internals are maintained properly aligned, and which may be used for all size valves and is well suited for small and medium size valves with limited space or access inside the valve, and particularly slide valves for flow of highly abrasive particles, such as flow of iron ore and other abrasive materials.

SUMMARY OF THE INVENTION

The present invention is directed to such a slide valve in which product flow is controlled through the valve. The internals of the slide valve comprise the orifice plate, a guide assembly for the slide or disc connected to an internal support cone which is fixed to the valve body by a split clamp, which internals may be removed and replaced quickly and easily by disengaging and reclamping the split clamp. The internal support clamp permits high temperatures (1,000° F. +) and high pressure (50 psi+) transfer of product through the valve assembly. Further details and aspects of the slide valve of the present invention are set forth in the following description of preferred embodiments.

Accordingly, it is an object of the present invention to provide such a slide valve which eliminates bolting under load subject to differential pressure in the valve.

It is a further object of the present invention to provide such a slide valve which is much stronger than slide valves using a bolted system to maintain the internals in place in the valve.

It is yet a further object of the present invention to provide such a slide valve which provides improved sealing by utilizing metal to metal sealing, and which eliminates the need for a gasket, although a gasket may be used if desired.

It is still a further object of the present invention to provide such a slide valve in which the internals are easier to remove and replace than in current slide valves.

A further object of the present invention is that the internal parts are maintained in proper alignment.

It is yet a further object of the present invention to provide such a slide valve which may be utilized for all sizes of valves, which is suited for small and medium sized valves having limited space and access inside of the valve which complicates drilling and tapping of bolt holes required in conventional designs and particularly for high abrasive flow, such as flow of iron ore and other abrasive flow.

Other and further objects, features, and advantages are set forth and are inherent in the slide valve as set forth throughout the specification and claims.

DESCRIPTION OF THE PREFERRED EMBODIMENTS

Figure 1:
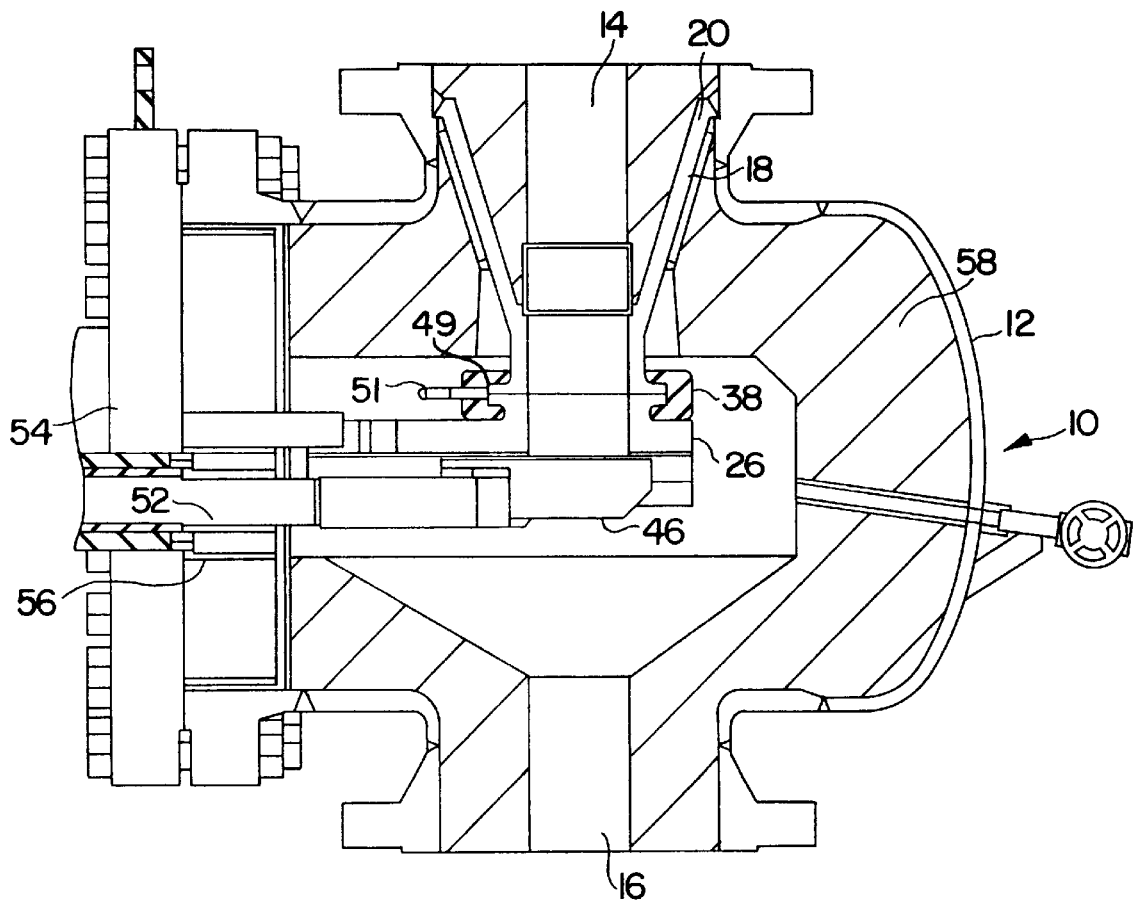
FIG. 1 is an elevational view in section of a slide valve of the present invention.
Figure 2:
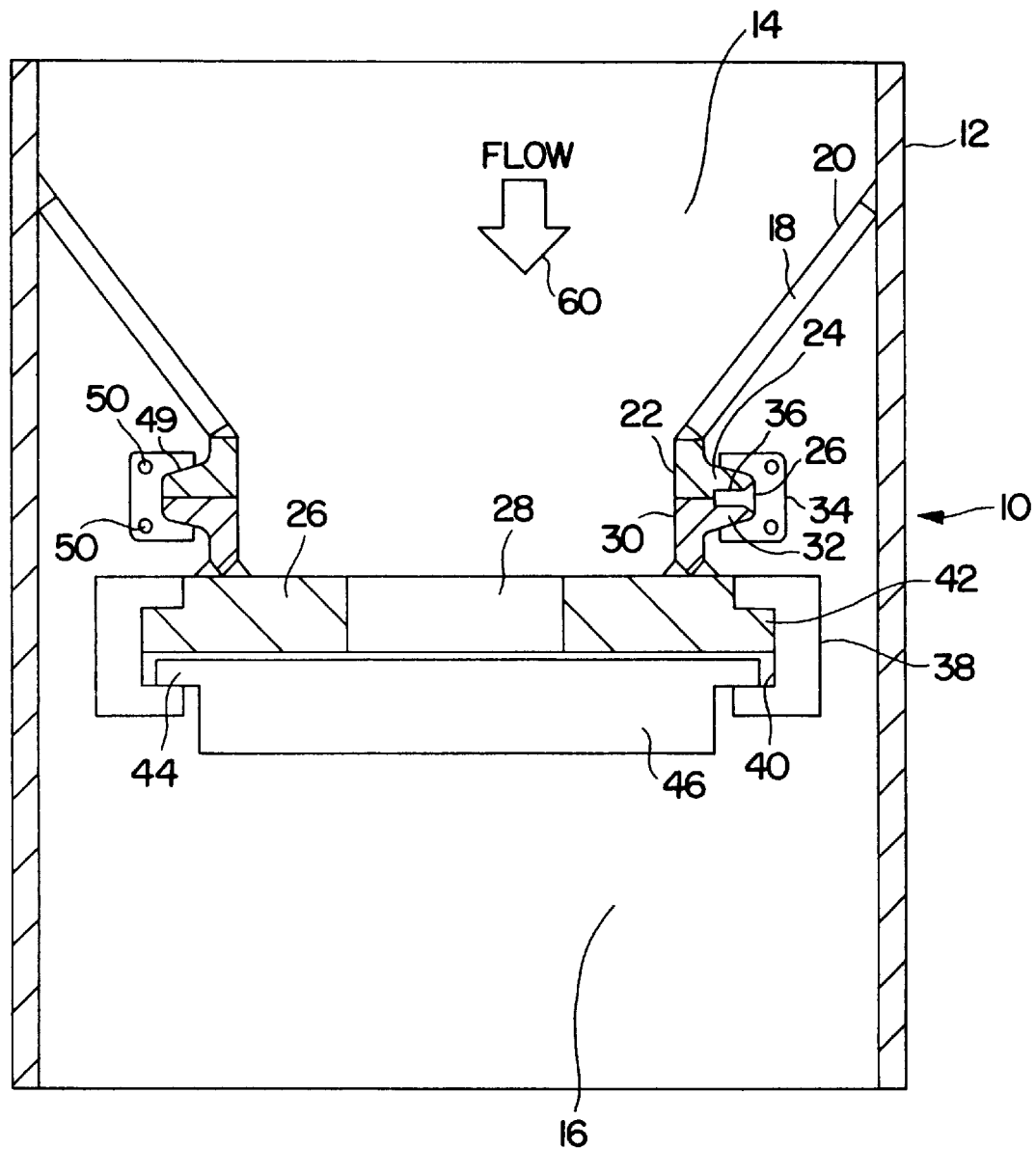
FIG. 2 is an elevational view of the slide valve of FIG. 1 looking in from the bonnet opening.

Referring to FIG. 1, an improved slide valve 10 of the present invention is illustrated which includes the valve body 12 which has the upstream entrance area 14 and the downstream outlet area 16 and a support cone 18 having an entrance chamber 20 connected to the valve body 12 adjacent its upstream entrance area 14. As best shown in FIG. 2, an upstream flange ring 22 having an outwardly extending projection 24 is secured to the downstream end of the support cone 18 such as by welding. An orifice plate 26 having the orifice 28 is secured to the downstream flange ring 30 and is provided with the outwardly extending projection 32. As illustrated, the upstream flange ring 22 and downstream flange ring 30 are disposed in abutting relation and are clamped together by the split clamp 34 clamping the clamp projections 22 and 30. An alignment pin 36 is disposed between the upstream and downstream clamp projections 24 and 32 to maintain the parts in alignment in use.

An overhang guide 38 having the inwardly facing groove 40 is disposed about the projection 42 on the orifice plate so that the overhead guide 38 hangs from and is supported by the orifice plate 26. The inward facing groove 40 extends downwardly enough so as to provide a guide for the slides 44 on the slide or disc 46.

Figure 3:
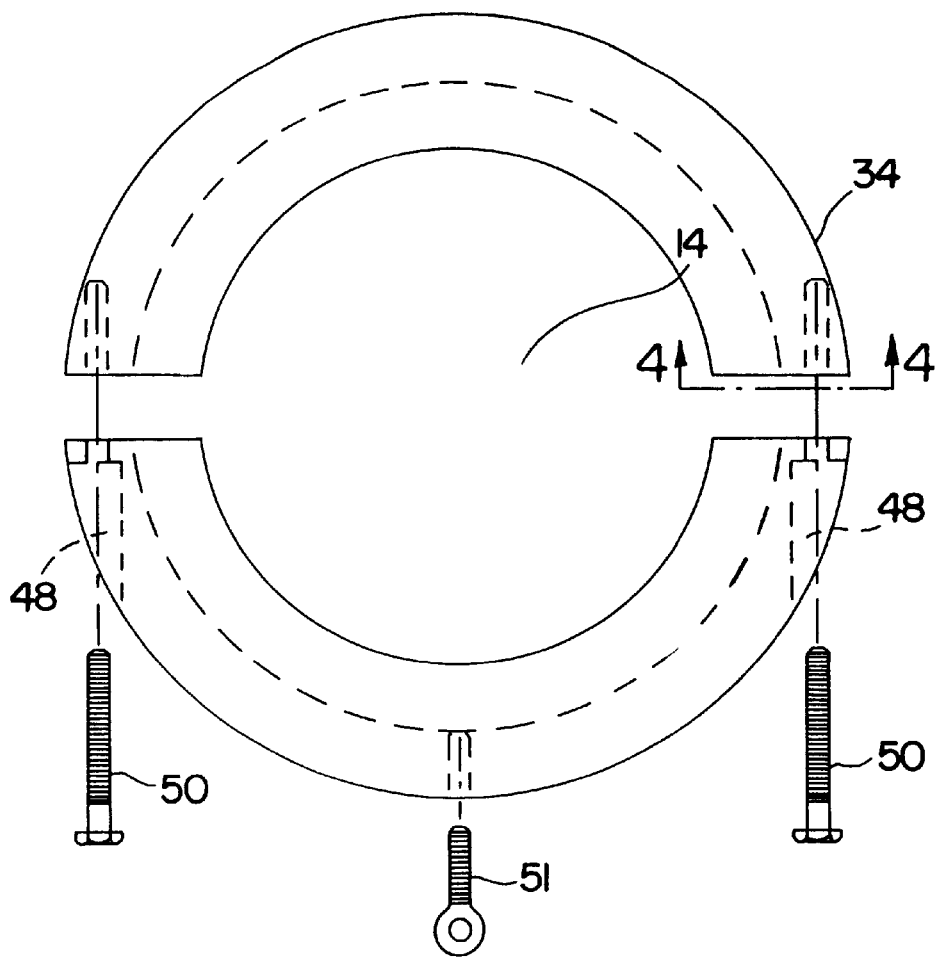
FIG. 3 is an exploded plan view of a split clamp according to the invention.
Figure 4:
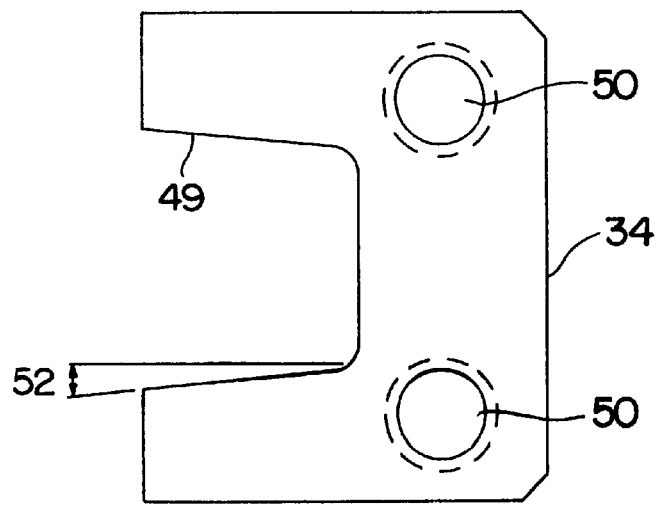
FIG. 4 is a cross-sectional view taken along the line 4—4 of FIG. 2.

As best seen in FIGS. 3 and 4, to which reference is now made, the split clamp 34 has the threaded bolt holes 48 into which the clamp bolts 50 are threaded thereby clamping the split clamp together by a pulling action of the bolts 50 about the upstream flange 22 and its projection 24 and the downstream flange 30 and its projection 32 thereby supporting in position the internals comprising the downstream flange 32, the orifice plate 26, the overhang guide 38, and the slide or disc 46. Thus, the clamping action of the split clamps 34 secures the internals into position, and as previously mentioned, the alignment pin 36 maintains the internals in alignment in operation. Also, this clamping action provides a strong metal to metal seal; and the use of a gasket is not required, although one may be used if so desired.

Referring to FIG. 4, the clamping surfaces 49 of the split clamp 34 may be tapered to provide the wedging clamping, preferably 5° as indicated by the reference numeral 52 although the clamping surfaces may be tapered less or more and may not be tapered at all for effective clamping action.

Also, as illustrated in FIG. 3, a jacking bolt 51 may be provided for removal and replacement of the internals on release of the split clamp 34.

In operation and with reference to FIG. 1, the slide or disc 46 is reciprocated by an actuator rod 52 which is connected to the slide or disc 46 and which sealingly extends through the bonnet 54. The actuator rod can be actuated by any suitable means, not shown, and has a suitable stuffing box or sealing arrangement 56 which are conventional in valves of this type; accordingly, no further description thereof is deemed necessary or given.

As illustrated in FIG. 1, suitable refractory material 58 secured in the valve body 12 having the flow passage 60 therethrough may be utilized.

Any refractory material having sufficient strength can be used for the liner and is available from a number of suppliers, including Harbison Walker (Pittsburgh, Pa.), National Refractories (Oakland, Calif.), Norton Co. (Worchester, Mass.), The Carborundum Co. (Niagara Falls, N.Y.), Resco Products, Inc. (Morristown, Pa.), Plibrico (Chicago, Ill.), and A. P. Green (Mexico, Mo.). Any such refractory material having a modulus of rupture (MOR) over about 1200 psi at normal operating temperatures (about 1400 to about 1900 psi is preferred) is suitable for use in the present invention; and many commercially available composites can either be modified by adding alumunina and/or zirconia to increase MOR or by varying such parameters as aggregate size, cooling rate, pressure, percentable solids, vibration frequency, all as are known in the art, to maximize the strength thereof for use in accordance with the present invention.

Figure 5:
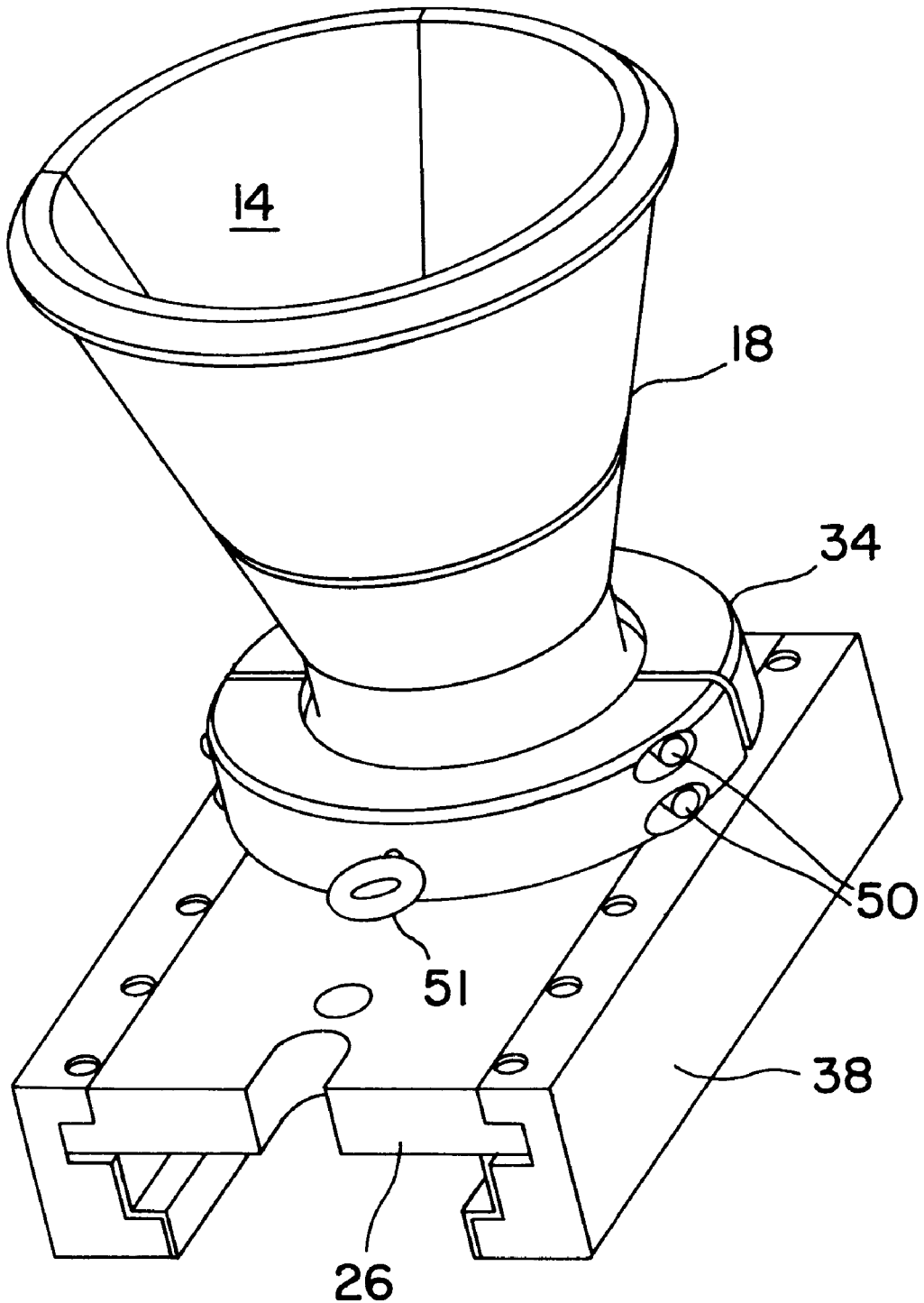
FIG. 5 is a perspective view of the support cone and the split clamp securing the orifice plate and the slide valve to the support cone.

Also, and with reference to FIG. 5, a perspective view is shown of the cone 18, the split clamp 34, the overhang guide 38, and the orifice plate 26.

The split clamp 34 preferably is ring shaped, as shown, as are the upstream and downstream flanges 22 and 30. These parts may take other shapes, if desired, so long as sufficient clamping action is maintained for the purposes mentioned above and an orifice opening for flow of product through it is provided.

Accordingly, the present invention is well suited and adapted to attain the objects and ends and has the advantages and features mentioned as well as others inherent therein.

While presently preferred embodiments of the invention have been given for the purpose of disclosure, changes can be made therein which are within the spirit of the invention as defined by the scope of the appended claims.

What is claimed is:

1. An improved control valve of the slide type comprising,
   a body having a valve chamber with an upstream entrance area and a downstream outlet area,
   a support cone having an entrance chamber connected to the body extending to the upstream entrance of the valve chamber and a downstream outlet,
   an upstream flange having an outwardly extending projection welded to the downstream outlet of the cone,
   an orifice plate provided with an orifice and having an outwardly extending projection,
   a downstream flange having an outwardly extending projection welded to the orifice plate,
   the upstream and downstream flanges having abutting surfaces disposed together in abutting relationship about the orifice, a split clamp having clamping surfaces releasably disposed about and clamping together the upstream and downstream flanges by pulling the abutting surfaces together into sealing relationship, an alignment pin disposed between the projections on the upstream and downstream flanges effective to prevent rotation of the upstream and downstream flanges relative to one another thereby maintaining them in alignment, an overhang guide having an inwardly facing support and guide groove disposed about and hanging from the orifice plate in which the outwardly extending projection of the downstream flange is disposed thereby supporting the overhang guide, a valve slide having an outwardly extending slide slidably disposed in the inwardly extending guide groove of the overhang guide downstream of the orifice plate operable to open and close the orifice, whereby the downstream flange, the orifice plate and the overhang guide are released and removed as a unit by separating the split clamp and are replaced and inserted as a unit by clamping them in place by the clamping action of the split clamp.

2. The control valve of claim 1 where,
the clamping surfaces of the split clamp are tapered.

3. The control valve of claim 1 where,
the split clamp is releasably clamped together by bolts.

4. The control valve of claim 1 where,
the clamping surfaces of the split clamp are tapered, and
the split clamp is releasably clamped together by bolts.

5. The control valve of claim 1 including,
refractory material secured to the inner surfaces of the body, the support cone, surface of the orifice plate and slide valve, and having a flow passage therethrough.

6. An improved control valve of the slide type comprising,
a body having a valve chamber with an upstream entrance area and a downstream outlet area, an upstream flange welded in the body, the valve chamber having a support projection extending outwardly and spaced from the body, a downstream flange adjacent the upstream flange and having an outwardly extending support projection spaced from the body, the upstream and downstream flanges having abutting surfaces, an internal slide valve assembly having an orifice plate with an orifice, a slide valve, and guides operable to open and close the orifice opening upon movement of the slide valve, a split clamp having clamping surfaces releasably disposed about and clamping together the upstream and downstream support flanges by pulling the abutting surfaces together into sealing relationship, and an alignment pin disposed between the support projections on the upstream and downstream flanges effective to prevent rotation of the support projections relative to one another thereby maintaining the flanges in alignment, whereby the downstream flanges and the internal slide valve assembly are released and removed as a unit by separating the split clamp and are replaced and inserted as a unit by clamping them in place by the clamping action of the split clamp.

7. The control valve of claim 6 where,
the clamping surfaces of the split clamp are tapered.

8. The control valve of claim 6 where,
the split clamp is releasably clamped together by bolts.

9. The control valve of claim 6 where,
the clamping surfaces of the split clamp are tapered, and
the split clamp is releasably clamped together by bolts.

10. The control valve of claim 6 including,
refractory material secured to the inner surfaces of the body, the surfaces of the orifice plate and the slide valve, and having a flow passage therethrough.

* * * * *